United States Patent
Chen et al.

(10) Patent No.: US 10,297,050 B2
(45) Date of Patent: May 21, 2019

(54) METHODS FOR POSITIONING A TARGET IN A THREE-DIMENSIONAL CT IMAGE AND CT SYSTEMS FOR SECURITY INSPECTION

(71) Applicant: NUCTECH COMPANY LIMITED, Beijing (CN)

(72) Inventors: Zhiqiang Chen, Beijing (CN); Li Zhang, Beijing (CN); Shuo Wang, Beijing (CN); Yunda Sun, Beijing (CN); Qingping Huang, Beijing (CN); Zhi Tang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 292 days.

(21) Appl. No.: 15/300,709

(22) PCT Filed: Dec. 14, 2015

(86) PCT No.: PCT/CN2015/097274
§ 371 (c)(1),
(2) Date: Sep. 29, 2016

(87) PCT Pub. No.: WO2016/095776
PCT Pub. Date: Jun. 23, 2016

(65) Prior Publication Data
US 2017/0276823 A1    Sep. 28, 2017

(30) Foreign Application Priority Data
Dec. 18, 2014 (CN) .......................... 2014 1 0795060

(51) Int. Cl.
*G01V 5/00* (2006.01)
*G06K 9/46* (2006.01)
(Continued)

(52) U.S. Cl.
CPC ............. *G06T 11/20* (2013.01); *G01V 5/005* (2013.01); *G01V 5/0008* (2013.01); *G06K 9/46* (2013.01);
(Continued)

(58) Field of Classification Search
CPC ... G06T 11/20; G06T 7/50; G06T 7/75; G06T 7/60; G06T 15/20; G06T 19/20;
(Continued)

(56) References Cited

U.S. PATENT DOCUMENTS

| 6,721,387 | B1 | 4/2004 | Naidu et al. |
| 2009/0079738 | A1 | 3/2009 | Liao |
| 2011/0254845 | A1* | 10/2011 | Oikawa .................. G06T 15/08 345/427 |

FOREIGN PATENT DOCUMENTS

| CN | 102222352 | 10/2011 |
| EP | 2 713 340 | 4/2014 |

(Continued)

OTHER PUBLICATIONS

International Search Report and Written Opinion dated Feb. 14, 2016 in corresponding International Patent Application No. PCT/CN2015/097274.
(Continued)

*Primary Examiner* — Courtney D Thomas
(74) *Attorney, Agent, or Firm* — Pillsbury Winthrop Shaw Pittman LLP

(57) ABSTRACT

Disclosed is a method for positioning a target in a three-dimensional CT image and a CT system for security inspection. The method includes: displaying a three-dimensional CT image; receiving a selection by a user of at least one area of the three-dimensional CT image at a viewing angle; generating at least one set of three-dimensional objects in a depth direction based on the selection; and determining a
(Continued)

target object from the set. With the above technical solutions, the user may be facilitated in marking a suspected object in a CT image in a quick manner.

20 Claims, 3 Drawing Sheets

(51) Int. Cl.
G06T 11/20 (2006.01)
G06T 19/20 (2011.01)
G06T 15/20 (2011.01)
G06K 9/52 (2006.01)
G06T 7/60 (2017.01)
G06K 9/62 (2006.01)
G06T 7/73 (2017.01)
G06T 7/50 (2017.01)

(52) U.S. Cl.
CPC ............. *G06K 9/52* (2013.01); *G06K 9/6218* (2013.01); *G06T 7/50* (2017.01); *G06T 7/60* (2013.01); *G06T 7/75* (2017.01); *G06T 15/20* (2013.01); *G06T 19/20* (2013.01); *G06K 2009/4666* (2013.01)

(58) Field of Classification Search
CPC ........ G01V 5/0008; G01V 5/005; G06K 9/46; G06K 9/52; G06K 9/6218
USPC .................................................. 378/4–20, 57
See application file for complete search history.

(56) References Cited

FOREIGN PATENT DOCUMENTS

| WO | 2010/050952 | 5/2010 |
| WO | 2011/046511 | 4/2011 |
| WO | WO 2013/142072 A2 | 9/2013 |

OTHER PUBLICATIONS

Extended European Search Report as issued in European Patent Application No. 15869283.0, dated Jul. 14, 2017.

Rusu, R. B., et al., "Close-range Scene Segmentation and Reconstruction of 3D Point Cloud Maps for Mobile Manipulation in Domestic Environments," 2009 IEEE/RSJ International Conference on Intelligent Robots and Systems, 2009, ISBN: 978-1-4244-3803-7, pp. 1-6.

* cited by examiner

METHODS FOR POSITIONING A TARGET IN A THREE-DIMENSIONAL CT IMAGE AND CT SYSTEMS FOR SECURITY INSPECTION

This application is a U.S. National Phase Application of International Patent Application No. PCT/CN2015/097274, filed on Dec. 14, 2015, which claims priority to Chinese Patent Application No. 201410795060.7, filed on Dec. 18, 2014.

TECHNICAL FIELD

The present disclosure relates to the field of security inspection, and in particular, to methods for positioning a target in a three-dimensional CT (Computerized Tomography) image and systems for security inspection.

BACKGROUND

A multi-energy X-ray security inspection system is a new type of security inspection system developed based on a mono-energy X-ray security inspection system. It can provide not only shape and content of an object to be inspected but also information about effective atomic number for the object to be inspected, to determine whether the object to be inspected is organic or inorganic, which can be displayed on a color monitor with different colors to facilitate a human operator in identification.

During reading an image, if a suspected object is found, a human operator is required to mark the suspected object with an input device, such as a mouse. For a luggage inspection system of a DR (Digital Radiography) type, the principle for marking a suspected object on a two-dimensional DR image is simple and there are many proven solutions. For a security inspection system of a CT type, there is still a problem to be solved that how to mark a suspected object on a three-dimensional image generated based on CT data in a quick manner.

SUMMARY

In view of one or more technical problems in the prior art, the present disclosure proposes a method for positioning a target in a three-dimensional CT image and a security inspection system which may facilitate users in marking a suspected object in a CT image in a quick manner.

In an aspect of the present disclosure, a method for positioning a target in a three-dimensional CT image is proposed, including the steps of: displaying a three-dimensional CT image; receiving a selection by a user of at least one area of the three-dimensional CT image at a viewing angle; generating at least one set of three-dimensional objects in a depth direction based on the selection; and determining a target object from the set.

According to some embodiments, during a three-dimensional rendering process of the three-dimensional CT image, point cloud information for characterizing the object to be inspected is recorded, and the method further includes the steps of: acquiring a point cloud information cluster sequence for outer surfaces of different objects in the selected area by separating; and determining at least one selected area from the point cloud information cluster sequence for different objects based on a predetermined reference.

According to some embodiments, an object corresponding to a point cluster having the greatest number of point clouds is determined as the target object.

According to some embodiments, the objects in the three-dimensional CT image are separated to acquire at least one set of three-dimensional objects from at least one object intersected in a depth direction of the selected area.

According to some embodiments, an object in the set which is closest to the viewpoint is determined as the target object.

According to some embodiments, objects in the set are presented to the user and the target object is determined based on the user selection.

According to some embodiments, an object in the set of which a physical property meets a predetermined criterion is determined as the target object.

In another aspect of the present disclosure, a security inspection CT system is proposed, including: a CT scanning device configured to acquire inspection data for an object to be inspected; a memory configured to store the inspection data; a display device configured to display a three-dimensional CT image for the object to be inspected; an input device configured to input a selection by a user of at least one area of the three-dimensional CT image at a viewing angle; and a data processor configured to generate at least one set of three-dimensional objects in a depth direction based on the selection, wherein a target object is determined from the set.

According to some embodiments, during a three-dimensional rendering process of the three-dimensional CT image, point cloud information for characterizing the object to be inspected is recorded, and the data processor is configured to: acquire a point cloud information cluster sequence for different objects in the selected area by separating; and determine at least one selected area from the point cloud information cluster sequence for different objects based on a predetermined reference.

According to some embodiments, the data processor is configured to separate the objects in the three-dimensional CT image to acquire at least one set of three-dimensional objects from at least one object intersected in a depth direction of the selected area.

With the above technical solutions, the user may be facilitated in marking a suspected object in a CT image in a quick manner.

BRIEF DESCRIPTION OF THE DRAWINGS

To understand the present disclosure in a better way, a detailed description of the present disclosure will be given with reference to the following drawings, in which.

DETAILED DESCRIPTION

Specific embodiments of the present disclosure will be described in detail below and please note that the embodiments described herein are used for the purpose of exemplification rather than limitation of the present disclosure. Hereinafter, to provide a thorough understanding of the present disclosure, numerous specific details are set forth. However, it would be obvious for one ordinarily skilled in the art that the present disclosure can be practiced without these specific details. In other examples, known structures, materials, or methods are not described in detail to avoid any possible obfuscation of the present disclosure.

Throughout the specification, the reference to "an embodiment", "the embodiment", "an example", or "the example" is meant that a specific feature, structure, or feature described with reference to this embodiment or example is contained by at least one embodiment of the present disclosure. Therefore, the phrases "in an embodiment", "in the embodiment", "an example", or "the example" throughout the specification is not necessarily intended to refer to a same embodiment or example. Further, specific features, structures, or characteristics may be combined into one or more embodiments or examples in any suitable combination and/or sub-combination. Further, it is appreciated by one ordinarily skilled in the art that the term "and/or" used herein comprises any and all combinations of one or more related items that are listed.

With regard to the problem of the prior art that a suspected object cannot be marked quickly in a three-dimensional image generated from the CT data, the embodiments of the present disclosure propose a method for positioning a target in a three-dimensional CT image. First, a three-dimensional CT image is displayed on a display device. After that, a selection of at least one area of the three-dimensional CT image at a viewing angle is received from a user by an input device, such as a mouse. Next, at least one set of three-dimensional objects is generated in a depth direction based on the selection, and a target object is determined from the set. With the above technical solution, by selecting at one viewing angle, a three-dimensional target object can be determined, and therefore the user may be facilitated in marking the suspected object in the CT image in a quick manner.

Figure 1:
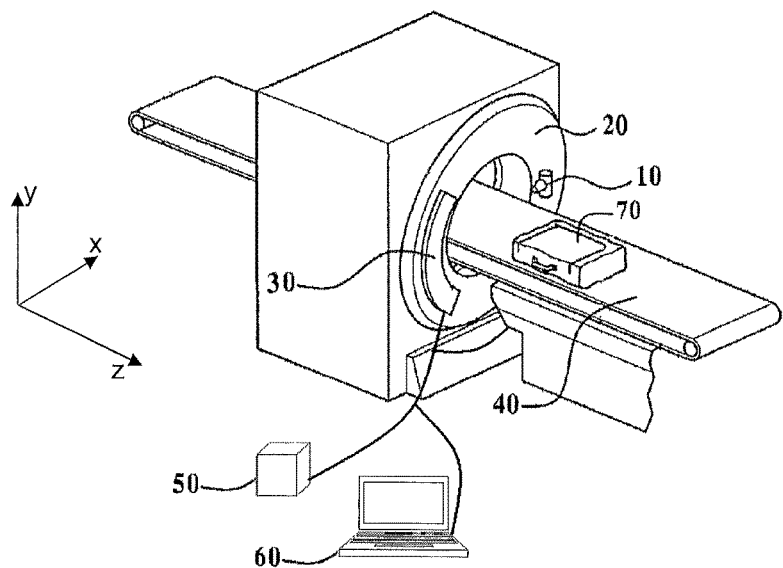
FIG. 1 is a diagram showing the schematic structure of a security inspection CT system according to an embodiment of the present disclosure.

FIG. 1 is a diagram showing the schematic structure of a CT system according to an embodiment of the present disclosure. As shown in FIG. 1, a CT device according to this embodiment includes: a gantry 20, a bearing mechanism 40, a controller 50, a computer data processor 60, or the like. The gantry 20 includes a ray source 10 configured to emit X-rays for inspection, such as an X-ray machine, and a detecting and collecting apparatus 30. The bearing mechanism 40 bears a luggage to be inspected 70 to pass through the scanning area of the gantry 20 between the ray source 10 and the detecting and collecting apparatus 30, while the gantry 20 rotates about the travelling direction of the luggage to be inspected 70 such that the rays emitted from the ray source 10 are able to penetrate through the luggage to be inspected 70 and a CT scan is performed on the luggage to be inspected 70.

The detecting and collecting apparatus 30 is, for example, a detector-and-data-collector with an integrated modular structure, such as an array detector, for detecting rays transmitted through the object to be inspected such that analog signals are acquired and converted into digital signals, thereby outputting projection data of the luggage to be inspected 70 with respect to the X-rays. The controller 50 is used for controlling various parts of the whole system to operate synchronously. The computer data processor 60 is used for processing the data collected by the data collector, processing and reconstructing the data, and outputting the result.

As shown in FIG. 1, the ray source 10 is located on a side of the object to be inspected, and the detecting and collecting apparatus 30 including a detector and a data collector is located on the other side of the luggage to be inspected 70 to acquire multi-angle projection data for the luggage to be inspected 70. The data collector includes a data amplification shaping circuit which may operate in a (current) integration manner or a pulse (counting) manner. A data output cable of the detecting and collecting apparatus 30 is coupled to the controller 50 and the computer data processor 60, and stores the collected data into the computer data processor 60 based on a trigger command.

Figure 2:
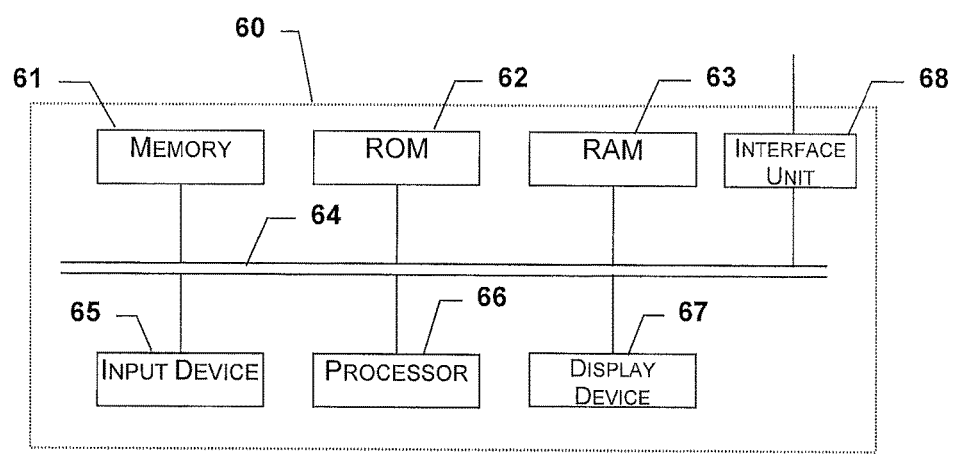
FIG. 2 is a schematic block diagram showing the structure of the computer data processor as shown in FIG. 1.

FIG. 2 is a schematic block diagram showing the structure of the computer data processor 60 as shown in FIG. 1. As shown in FIG. 2, the data collected by the data collector is stored into a memory 61 via an interface unit 68 and a bus 64. Configuration information and programs for the computer data processor are stored in a Read-Only Memory (ROM) 62. A Random Access Memory (RAM) 63 is used for temporarily storing various data during the operation of a processor 66. In addition, computer programs for data processing are also stored in the memory 61. The internal bus 64 connects the above memory 61, Read Only Memory (ROM) 62, Random Access Memory (RAM) 63, an input device 65, the processor 66, a display device 67, and the interface unit 68.

After an operation command is input by a user via the input device 65, such as a keyboard, a mouse, etc., the code instructions of the computer program instructs the processor 66 to perform a predetermined data processing algorithm. After the result of the data processing is acquired, it will be displayed on the display device 67, such as an LCD display, or output directly in a hardcopy form, such as printing.

Figure 3:
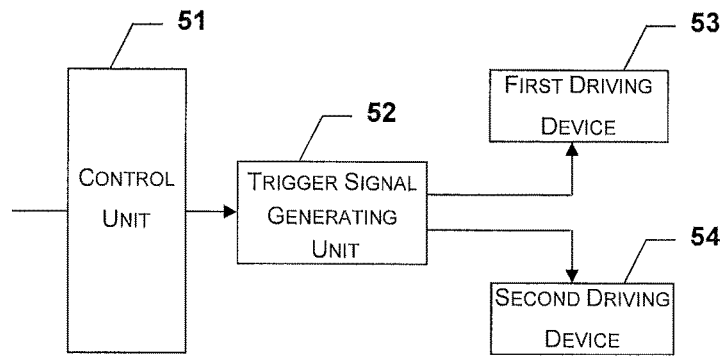
FIG. 3 is a schematic block diagram showing the structure of a controller according to an embodiment of the present disclosure.

FIG. 3 is a block diagram showing the schematic structure of a controller according to an embodiment of the present disclosure. As shown in FIG. 3, the controller 50 includes a control unit 51 configured to control the ray source 10, the bearing mechanism 40, and the detecting and collecting apparatus 30 based on the instructions from the computer 60; a trigger signal generating unit 52 configured to generate a trigger command to trigger actions of the ray source 10, the detecting and collecting apparatus 30, and the bearing mechanism 40 under the control of the control unit; a first driving device 53 configured to drive the bearing mechanism 40 to transfer the luggage to be inspected 70 based on the trigger command which is generated by the trigger signal generating unit 52 under the control of the control unit 51; and a second driving device 54 configured to drive the gantry 20 to rotate based on the trigger command which is generated by the trigger signal generating unit 52 under the control of the control unit 51. The projection data acquired by the detecting and collecting apparatus 30 is stored in the computer 60 for CT tomographic image reconstruction, thereby acquiring the tomographic image data for the luggage to be inspected 70. After that, the computer 60 may acquire a DR image for the luggage to be inspected 70 from at least one viewing angle based on the tomographic image data, for example, by executing software, to be displayed along with the reconstructed three-dimensional image, thereby facilitating a human operator to perform a security inspection. According to other embodiments, the above CT imaging system may also be a dual-energy CT system, that is, the X-ray source 10 of the gantry 20 may emit two types of rays having high-energy and low-energy, respectively. After the detecting and collecting apparatus 30 collects the projection data under different energy levels, the computer data processor 60 may perform a dual-energy CT reconstruction to acquire effective atomic number and electron density data for various section layers of the luggage to be inspected 70.

Figure 4:
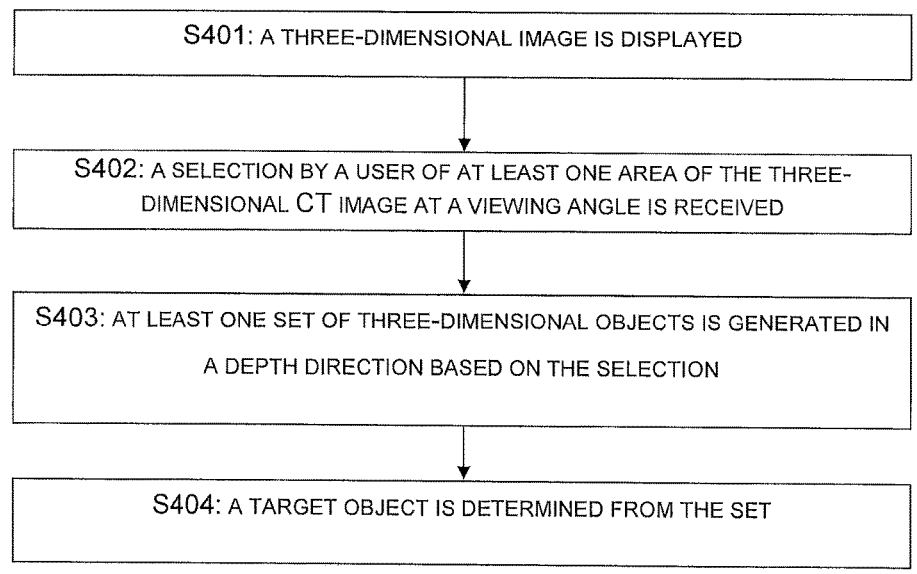
FIG. 4 is a flow chart showing a method for marking a suspected object in a CT system according to an embodiment of the present disclosure.

FIG. 4 is a flow chart showing a method for marking a suspected object in a CT system according to an embodiment of the present disclosure.

As shown in FIG. 4, at step S401, inspection data of an object to be inspected is read to display a three-dimensional image of the object to be inspected on a display device.

At step S402, a selection of at least one area of the three-dimensional CT image at a viewing angle is received from a user by an input device 65, such as a mouse. For example, the user uses the mouse to mark an area at a current viewing angle or to select a specific area at the current viewing angle on the three-dimensional image.

At step S403, at least one set of three-dimensional objects is generated in a depth direction based on the selection. By receiving a user selection at a certain viewing angle, for example, a user operating an input device to mark or circle a certain area in the image displayed on the screen, the computer 60 determines at least one three-dimensional object associated with the selection in that direction in the three dimensional image, to form a set of objects.

At step S404, a target object is determined from the set. For example, an object in this set which meets a predetermined criterion is determined as the target object.

Thus, the three-dimensional target object is determined by the selection of a part of the displayed 3D inspection image at a viewing angle, and therefore the number of operations by the user can be reduced. For example, during a 3D rendering process of the 3D inspection image, point cloud information for characterizing the object to be inspected is recorded, and the step of providing a feedback that the 3D inspection image includes at least one 3D virtual image for prohibited goods in response to the selection includes: acquiring a point cloud information cluster sequence for different object outer surfaces in the object to be inspected by separating; at least one selected area is determined from the point cloud information cluster sequence for different objects based on a predetermined reference; and whether there is the at least one 3D virtual image for prohibited goods in the at least one selected area is determined. In this case, an object corresponding to a point cluster having the greatest number of point clouds is determined as the target object.

Figure 5:
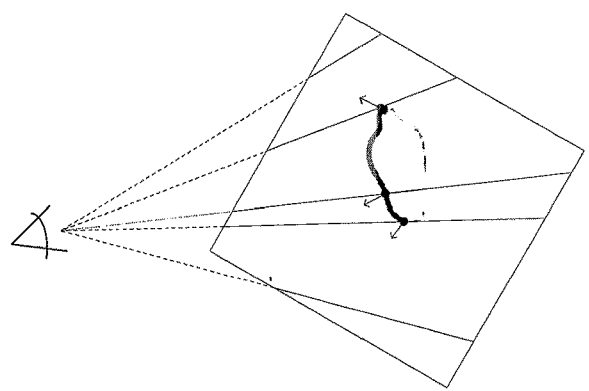
FIG. 5 is a diagram showing that the position where a non-transparent area in volume data is hit for the first time in a ray cast is recorded.

FIG. 5 is a diagram showing that the position where a non-transparent area in volume data is hit for the first time in a ray cast is recorded. As shown in FIG. 5, during the process of ray cast, a position where a non-transparent area in volume data is hit by the ray for the first time is recorded, and a normal vector is calculated for this position. For example, the normal vector at an incidence point is estimated by using the gradient of this voxel position.

According to some embodiments, in most cases, a one-time mark input from a user may be a non-closed curve. Therefore, the end points of non-closed curve may be automatically connected to form a closed curve, and then the generated graphic is either concave or convex. In order to render the graphic as fast as possible, after the graphic is tessellated into smaller convex polygons or triangles, they are combined together to form a final shape and acquire a solid filled-up shape. The image at the current viewing angle is tailored by using the solid filled-up shape as a binary mask image, to acquire the point cloud in the marked area and the normal vector for the corresponding position. Each point in the point cloud is associated with one feature vector which includes position coordinates of the point, the normal vector, and the atomic number value. After that, the point cloud data is separated by a classification algorithm in the feature space.

In some embodiments, the segmenting of adjoined objects in a space cannot be achieved by using only the position coordinates of the point for clustering. Therefore, the atomic number value may be introduced to make use of the advantage of the dual-energy CT in substance recognition, thereby efficiently solving the problem of separating the adjoined objects.

Figure 6:
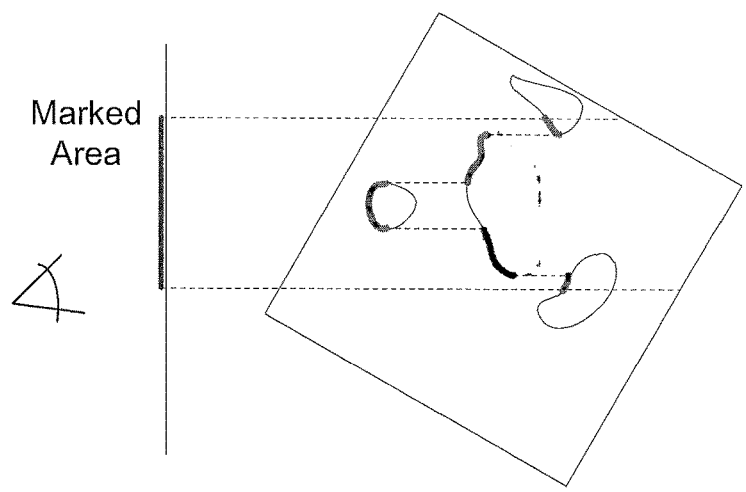
FIG. 6 is a diagram showing a case where an object having the greatest number of points is selected as an object to be marked from a separated point cloud cluster sequence.

FIG. 6 is a diagram showing a case where an object having the greatest number of points is selected as an object to be marked from a separated point cloud cluster sequence.

Figure 7:
FIG. 7 is a diagram showing a point cloud cluster which is acquired by separating according to an embodiment of the present disclosure.

By the above segmenting process, multiple clusters of point clouds may be acquired. For example, two point cloud clusters are acquired as shown in FIG. 7. In this case, the number of points in each cluster of point clouds is calculated individually, and the object having the greatest number of points is determined as the final marked object. This is because the more number of points the point cluster has, the more the corresponding object is exposed in the current marked area and it is the main visible object in the current marked area.

In other embodiments, the objects in the three-dimensional CT image are segmented to acquire at least one set of three-dimensional objects from at least one object intersected in a depth direction of the selected area. In this case, an object in the set which is closest to the viewpoint may be determined as the target object. Alternatively, objects in the set are presented to the user and the target object is determined based on the user selection. Alternatively, an object in the set of which a physical property meets a predetermined criterion is determined as the target object. For example, an object having an average atomic number value in a predetermined range is determined as the target object.

The above detailed description has already set forth numerous embodiments of the method for positioning a target in a three-dimensional image and a CT system for security inspection with reference to the diagrams, flow charts, and/or examples. In the case where the diagrams, flow charts, and/or examples comprise one or more functions and/or operations, one skilled in the art should appreciate that each function and/or operation in the diagrams, flow charts, or examples may be implemented by various structures, hardware, software, firmware or any combination thereof either alone and/or in any combination. In an embodiment, several parts of the subject matter described in the embodiments of the present disclosure may be implemented by Application Specific Integrated Circuit (ASIC), Field Programmable Gate Array (FPGA), Digital Signal Processor (DSP), or any other integrated form. However, one skilled in the art should appreciate that some aspects of the embodiment disclosed herein may be partially or wholly implemented in an integrated circuit equivalently, implemented as one or more computer programs running on one or more computers (for example, one or more programs running on one or more computer systems), implemented as one or more programs running on one or more processors (for example, one or more programs running on one or more micro-processors), implemented as firmware, or substantially any combination thereof, and one skilled in the art is capable to design the circuit and/or write software and/or firmware code. Further, one skilled in the art would appreciate that the mechanism of the subject matter of the present disclosure may be distributed in various forms of program products, and the exemplary embodiments of the subject matter of the present disclosure may be applicable irrespective of the specific types of signal carrier media for distribution. Examples of the signal carrier media comprise but not limited to: a recordable medium such as floppy disk, hard drive, compact disk (CD), digital versatile disk (DVD), digital tape, computer memory, etc.; and a transmission medium, such as digital and/or analog communication medium (for example, optical fiber, waveguide, wired communication link, wireless communication link, etc.)

Although the present disclosure is already described with reference to several typical embodiments, it is to be appreciated that the terms used herein are illustrative and exemplary, rather than limiting. Since the present disclosure may be practiced in multiple forms without departing from the spirit or essence, it is to be noted that the above embodiments are not limited to any previously described details and shall be interpreted broadly within the spirit and scope defined by the claims. Therefore, all changes and variations fall into the scope of the claims or their equivalents shall be embraced by the claims.

We claim:

1. A method for positioning a target in a three-dimensional CT image, the method comprising:
    displaying a three-dimensional CT image;
    receiving a selection by a user of at least one area of the three-dimensional CT image at a viewing angle, wherein during a three-dimensional rendering process of the three-dimensional CT image, point cloud information for characterizing outer surfaces of the object to be inspected is recorded;
    generating at least one set of three-dimensional objects in a depth direction based on the selection, wherein the generating comprises acquiring a point cloud information cluster sequence for different objects in the selected area by segmenting, and determining the at least one set of three-dimensional objects from the point cloud information cluster sequence for different objects based on a predetermined reference; and
    determining a target object from the set.

2. The method according to claim 1, wherein an object corresponding to a point cluster having the greatest number of point clouds is determined as the target object.

3. The method according to claim 1, wherein the objects in the three-dimensional CT image are separated to acquire at least one set of three-dimensional objects from at least one object intersected in a depth direction of the selected area.

4. The method according to claim 3, wherein an object in the set which is closest to the viewpoint is determined as the target object.

5. The method according to claim 3, wherein the set of three-dimensional objects are presented to the user and the target object is determined based on user selection.

6. The method according to claim 3, wherein an object in the set of which a physical property meets a predetermined criterion is determined as the target object.

7. A CT system for security inspection comprising:
    a CT scanning device configured to acquire inspection data for an object to be inspected;
    a memory configured to store the inspection data;
    a display device configured to display a three-dimensional CT image for the object to be inspected; and
    a data processor configured to generate at least one set of three-dimensional objects in a depth direction based on a selection by a user, using an input device, of at least one area of the three-dimensional CT image at a viewing angle, wherein a target object is determined from the set, wherein during a three-dimensional rendering of the three-dimensional CT image, point cloud information for characterizing outer surfaces of the object to be inspected is recorded and the generation of the at least one set of three-dimensional objects comprises acquisition of a point cloud information cluster sequence for different objects in the selected area by segmenting, and determination of the at least one set of three-dimensional objects from the point cloud information cluster sequence for different objects based on a predetermined reference.

8. The system according to claim 7, wherein the data processor is configured to segment the objects in the three-dimensional CT image to acquire at least one set of three-dimensional objects from at least one object intersected in a depth direction of the selected area.

9. The system according to claim 8, wherein an object in the set which is closest to the viewpoint is determined as the target object.

10. The system according to claim 8, wherein the set of three-dimensional objects are presented to the user and the target object is determined based on user selection.

11. The system according to claim 8, wherein an object in the set of which a physical property meets a predetermined criterion is determined as the target object.

12. The system according to claim 7, wherein an object corresponding to a point cluster having the greatest number of point clouds is determined as the target object.

13. A non-transitory computer-readable medium comprising instructions configured to cause a processor system to:
    display a three-dimensional CT image;
    receive a selection by a user of at least one area of the three-dimensional CT image at a viewing angle, wherein during a three-dimensional rendering of the three-dimensional CT image, point cloud information for characterizing outer surfaces of the object to be inspected is recorded;
    generate at least one set of three-dimensional objects in a depth direction based on the selection, wherein the generation of the at least one set of three-dimensional objects comprises acquisition of a point cloud information cluster sequence for different objects in the selected area by segmenting, and determination of the at least one set of three-dimensional objects from the point cloud information cluster sequence for different objects based on a predetermined reference; and
    determine a target object from the set.

14. The non-transitory computer-readable medium according to claim 13, wherein the instructions are configured to determine an object corresponding to a point cluster having the greatest number of point clouds as the target object.

15. The non-transitory computer-readable medium according to claim 13, wherein the instructions are configured to separate objects in the three-dimensional CT image to acquire at least one set of three-dimensional objects from at least one object intersected in a depth direction of the selected area.

16. The non-transitory computer-readable medium according to claim 15, wherein the instructions are configured to determine an object in the set which is closest to the viewpoint as the target object.

17. The non-transitory computer-readable medium according to claim 15, wherein the instructions are configured to present the set of three-dimensional objects to the user and to determine the target object based on user selection.

18. The non-transitory computer-readable medium according to claim 13, wherein the instructions are configured to determine an object in the set of which a physical property meets a predetermined criterion as the target object.

19. The non-transitory computer-readable medium according to claim 18, wherein the physical property comprises an atomic number value.

20. The non-transitory computer-readable medium according to claim 13, wherein the segmenting involves use of a materials property of the objects in the selected area.

* * * * *